(12) United States Patent
Strömberg

(10) Patent No.: US 12,197,661 B2
(45) Date of Patent: Jan. 14, 2025

(54) POINTING DEVICE WITH SIGNAL COMPENSATION

(71) Applicant: TRAPPER HOLDING AB, Järfälla (SE)

(72) Inventor: Rolf Eric Ragnar Strömberg, Skä (SE)

(73) Assignee: TRAPPER HOLDING AB, Järfälla (SE)

( * ) Notice: Subject to any disclaimer, the term of this patent is extended or adjusted under 35 U.S.C. 154(b) by 0 days.

(21) Appl. No.: 18/493,310

(22) Filed: Oct. 24, 2023

(65) Prior Publication Data

US 2024/0143095 A1    May 2, 2024

(30) Foreign Application Priority Data

Oct. 27, 2022   (SE) .................... 2200118-4

(51) Int. Cl.
  *G06F 3/038*    (2013.01)
  *G06F 3/03*    (2006.01)
  *G06F 3/0362*    (2013.01)
  *G06F 3/033*    (2013.01)
(52) U.S. Cl.
  CPC ............ *G06F 3/038* (2013.01); *G06F 3/0312* (2013.01); *G06F 3/033* (2013.01); *G06F 3/0362* (2013.01); *G06F 3/0383* (2013.01)

(58) Field of Classification Search
  CPC ...... G06F 3/038; G06F 3/0312; G06F 3/0383; G06F 3/0362; G06F 3/033
  See application file for complete search history.

(56) References Cited

U.S. PATENT DOCUMENTS 6,809,275 B1 * 10/2004 Cheng .................. H01H 25/008
                                                    200/18
7,782,303 B2 *  8/2010 Chou .................... G06F 3/0362
                                                    345/167

* cited by examiner

*Primary Examiner* — Douglas M Wilson
(74) *Attorney, Agent, or Firm* — Mark T. Vogelbacker; Eckert Seamans Cherin & Mellott, LLC

(57) ABSTRACT

A pointing device (1) for controlling a cursor on a computer monitor can include a control device (2) with two moving elements optionally in the form of an actuator cylinder (3) and a holder (7*a,b*). The actuator cylinder (3) is rotatable and translatably arranged relative to the holder (7*a,b*), and can be pushed down in a vertical direction by a user. A first sensor (8) is arranged to detect all movements and position changes of the actuator cylinder (3) and emit a first signal value (S1) to a signal processing unit (13*a,b*). At least one second sensor (11*a-c*) is arranged to detect the vertical position change of the actuator cylinder (3) and emit at least one second signal value (S2, S2*a*, S2*b*) which is proportional to the vertical position change of the actuator cylinder (3).

6 Claims, 4 Drawing Sheets

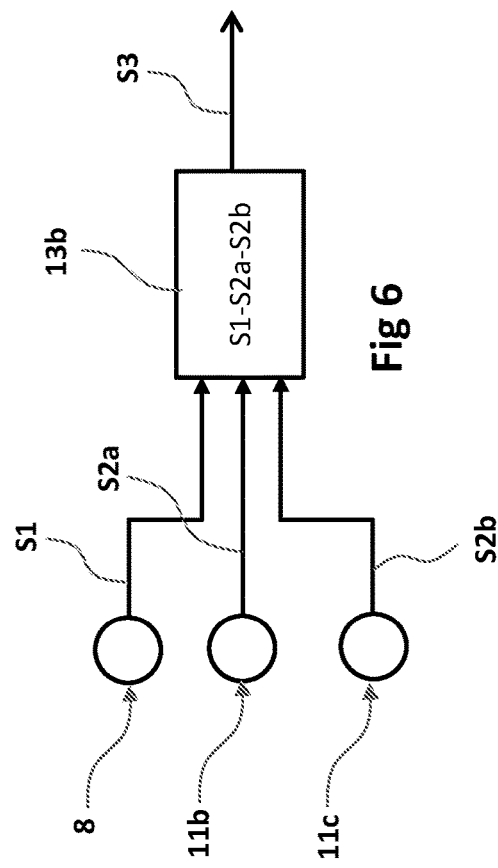
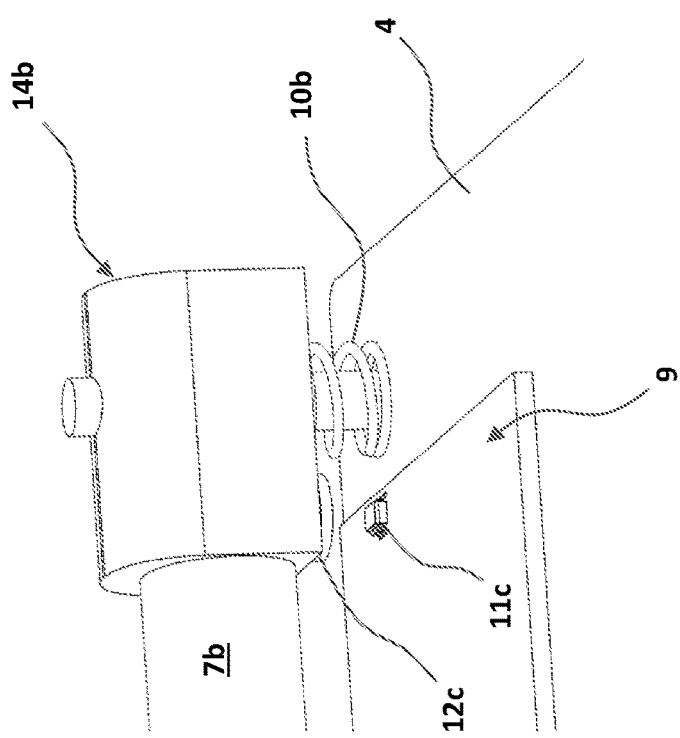

POINTING DEVICE WITH SIGNAL COMPENSATION

CROSS-REFERENCE TO RELATED APPLICATION

This application claims priority to and the benefit of Swedish Patent Application No. SE2200118-4, filed on Oct. 27, 2022, the disclosure of which is incorporated herein by reference in its entirety.

TECHNICAL AREA

The present invention concerns so-called centered pointing devices primarily intended for controlling a cursor on a computer monitor. Centered pointing devices are usually fitted with a control device consisting of at least two elements, partly an essentially fixed central axis and partly a cylinder which slides/rotates about the central axis. The cylinder is operable by the user of the pointing device and the movements of the cylinder are detected by one or more sensors.

PRIOR ART

A pointing device, such as a mouse or touchpad, is a device that allows a user to move a cursor on the monitor of a computer, for example.

The common and general pointing device today is the mouse that is dominant in the market. However, the mouse has one significant drawback, namely that the user has to move their hand away from the keyboard and place it over the mouse in order to move the cursor on the monitor. The mouse is also directly unsuitable in cases where a table surface is missing or if the space next to the computer is non-existent or limited.

At the time of writing, therefore, there are pointing devices on the market that are located between the user and the keyboard, including a rotatable and shiftable/translatable essentially rigid cylinder as a control device. The control device encloses, and can be translatable and rotated by a user around an essentially permanently mounted, often hollow, central cylinder. Rotation of the control device moves the cursor vertically on the computer monitor and axial movement/translation of the control device (sideways) moves the cursor horizontally on the monitor, hereinafter referred to as "control movement". It is also possible for a user to depress the control device and thus the central cylinder vertically a few millimeters, this movement is interpreted by the pointing device as turning on a switch, making a "click".

Detection of the control movement of the control device has been done in a version that is common on the market, in that an optical sensor is arranged inside the central cylinder and is permanently mounted to it. The optical sensor detects the movement of the control device in the axial and rotational directions. The advantage of this design is that the optical sensor physically follows even the vertical movement of the control device when "clicking", and a "click" is therefore not incorrectly detected as a displacement or rotation of the cylinder. The disadvantages of this sensor location is increased complexity; an opening must be milled in the central cylinder, the optical sensor must be fixed inside the cylinder, and a cable must be pulled out from the sensor to the electronics/power source located on the outside of the cylinder.

An alternative and older solution is that the sensor is instead permanently located in relation to the housing of the pointing device, preferably directly below the control device. A "click" is also not detected in this case as a translation or rotation of the cylinder along its axis because the sensor is positioned in a straight line with the position offset of the cylinder in vertical direction. However, the vertical movement of the cylinder moves the cylinder, and its detectable pattern, out of the focal point of the optical sensor, making the detection of other movements of the cylinder less accurate.

Since the optical sensor is located directly below the control device, the cylinder must be located higher up in the pointing device because the sensor takes up some physical space. The consensus among ergonomists and users is that a pointing device of the type described above should be designed with as low a build height as possible so that the device can be easily located in front of the computer and have a build height in relation to the keyboard that makes it comfortable to use.

Known technology does not solve said problem.

THE OBJECT OF THE INVENTION AND MOST IMPORTANT FEATURES

The present invention thus relates to technology related to centered pointing devices mainly intended for controlling a cursor on a computer monitor. A pointing device according to the invention is provided with an controlling device that can be influenced by the user and consisting of at least two elements, partly an essentially fixed central axis or holder and partly a cylinder which slides/rotates around the central axis or in the holder, whereby the cylinder is manoeuvrable, displaceable along its axial direction and/or rotatable about its axis, by the user of the pointing device.

In the pointing device according to the present invention, the user can also perform a "click" movement of the cylinder, i.e. the cylinder can be pushed vertically downwards in the pointing device. This displacement in vertical direction is detected by one or more sensors and triggers an electrical signal corresponding to that which a user can achieve by pressing a button on a conventionally known computer mouse. Through the "click" function, an optional command can be given to the computer.

The purpose of the invention is to demonstrate a design that allows the pointing device to be manufactured with a low built height.

A further purpose of the invention is that the sensor which detects the movements of the control device in axial direction and rotational direction can be located outside the actuator cylinder, preferably to the side of the actuator cylinder and fixed in relation to the housing of the pointing device.

A further purpose of the invention is that the control device should include a "click" function.

A further purpose of the invention is that the user's operation of the actuator cylinder should be detected correctly with high security and accuracy.

The above-mentioned purposes and further advantages are achieved according to the invention through a device defined in patent claim 1.

BRIEF DESCRIPTION OF THE INVENTION

The invention is thus based on that the pointing device comprises a first sensor for detecting the movements of the actuator cylinder, partly movements in an axial direction and partly movements in a rotational direction, and that at least one second sensor detects a mechanical movement of the actuator cylinder in a vertical direction.

The first sensor is fixedly mounted relative to the casing of the pointing device and is preferably located to the side of the actuator cylinder. A second sensor is preferably arranged below the actuator cylinder or at one or both of the control device's end parts and arranged to detect the movement of the actuator cylinder in a vertical direction.

The actuator cylinder is arranged in a holder, for example on a central shaft whose end parts are arranged on compressible springs so that the actuator cylinder can be moved in a vertical direction, preferably pushed essentially vertically downwards. When the user's mechanical pressure ceases, the actuator cylinder and its holder/shaft return to their original position, the "rest position".

The first sensor is arranged at one side of the actuator cylinder and optically focused towards the external surface of the actuator cylinder and detects any displacement in axial direction or rotation of the actuator cylinder. Its output signal can be said to be proportional to each displacement/rotation of the actuator cylinder. However, as the sensor is located to the side of the actuator cylinder, it is also affected by a vertical movement of the actuator cylinder, a movement that occurs when a "click" is activated, a physical depressing of the actuator cylinder.

A vertical movement, which thus occurs when "clicking" via the actuator cylinder, produces at the first optical sensor a change in the signal value which, uncompensated, would result in an unwanted "false" vertical downward movement of the cursor on the monitor. This unwanted vertical curser movement is therefore not based on an actual rotation of the actuator cylinder but solely due to the depressing of the actuator cylinder, and is therefore compensated according to the present invention in a signal processing unit by a second signal value, from a second position-sensitive sensor that detects the vertical movement of the actuator cylinder movements, are added in "opposite phase" to the first signal value. The second signal value is thus subtracted from the first signal value before the resulting signal value is allowed to affect the movements of the cursor on the monitor. Unwanted vertical cursor movements on the monitor are thereby eliminated in this way.

Two position-sensitive sensors are used in the event that the actuator cylinder rotates around a central axis. In this case, a sensor is located at each of the end portions of the central axis. The sum of these sensor's signal values is subtracted from the first sensor's signal value.

The invention is described in more detail in the following in the form of some embodiments with reference to the enclosed figures.

BRIEF DESCRIPTION OF DRAWINGS

FIG. 5 shows in more detail the suspension of the control device, whereby the end piece is movable in a vertical direction with the help of spiral springs.

FIG. 6 shows a block diagram of the processing of electrical signals generated by partly an optical sensor and partly position sensors arranged at both end parts of the control device.

DESCRIPTION OF A PREFERRED EMBODIMENT

The present invention thus relates to a pointing device, comprising a control device with an actuator cylinder and a holder or central shaft, intended to be located between a computer keyboard and a user.

Figure 1:
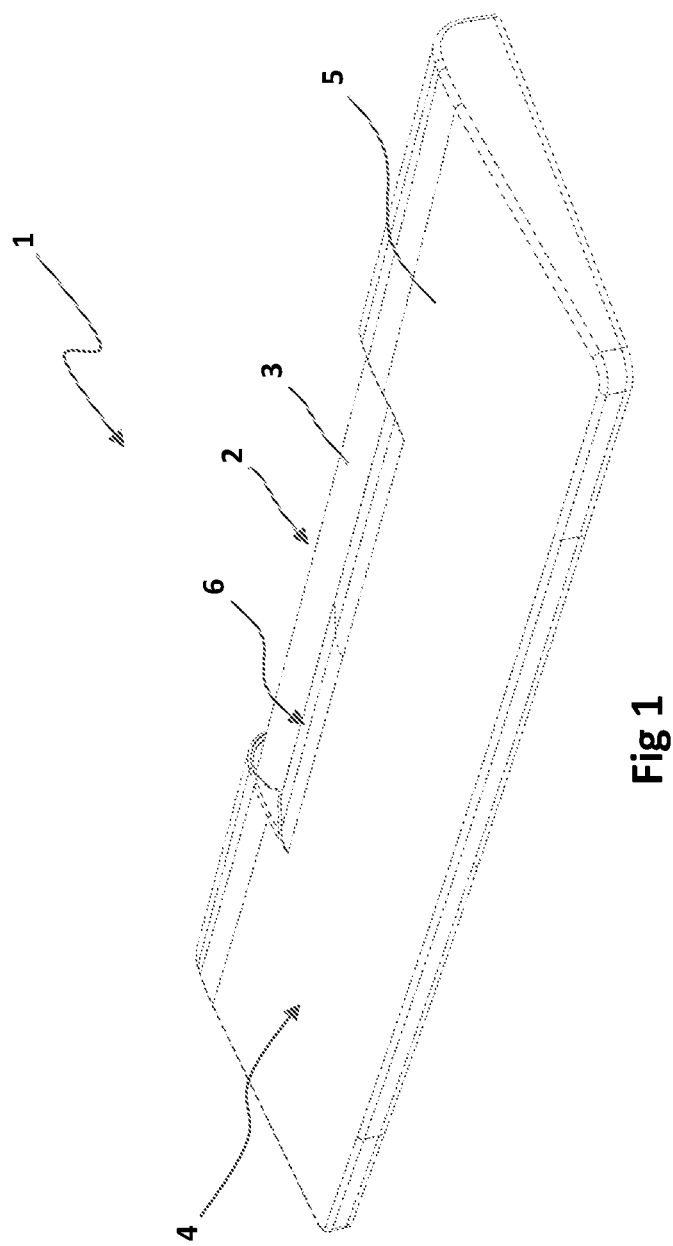
FIG. 1 shows in perspective a pointing device according to the invention, including a control device.

FIG. 1 shows in perspective, obliquely from above, a pointing device 1 according to the invention with a control device 2 comprising a user-displaceable/translatable/rotatable, essentially rigid actuator cylinder 3. The pointing device 1 includes a housing 4 which can be provided with a palm rest on its upper surface 5, buttons/keys for various computer functions etc (not shown). The actuator cylinder 3 can be moved laterally by the user and/or rotated via an operating opening 6 arranged in the upper surface 5 of the housing.

When the user rotates the actuator cylinder 3 with his hand and/or fingers, the cursor is moved vertically on the computer monitor and when the actuator cylinder 3 is displaced in its axial direction, the cursor is moved horizontally on the monitor. Thus, the cursor can be moved freely by the user over the entire surface of the monitor.

Figure 2:
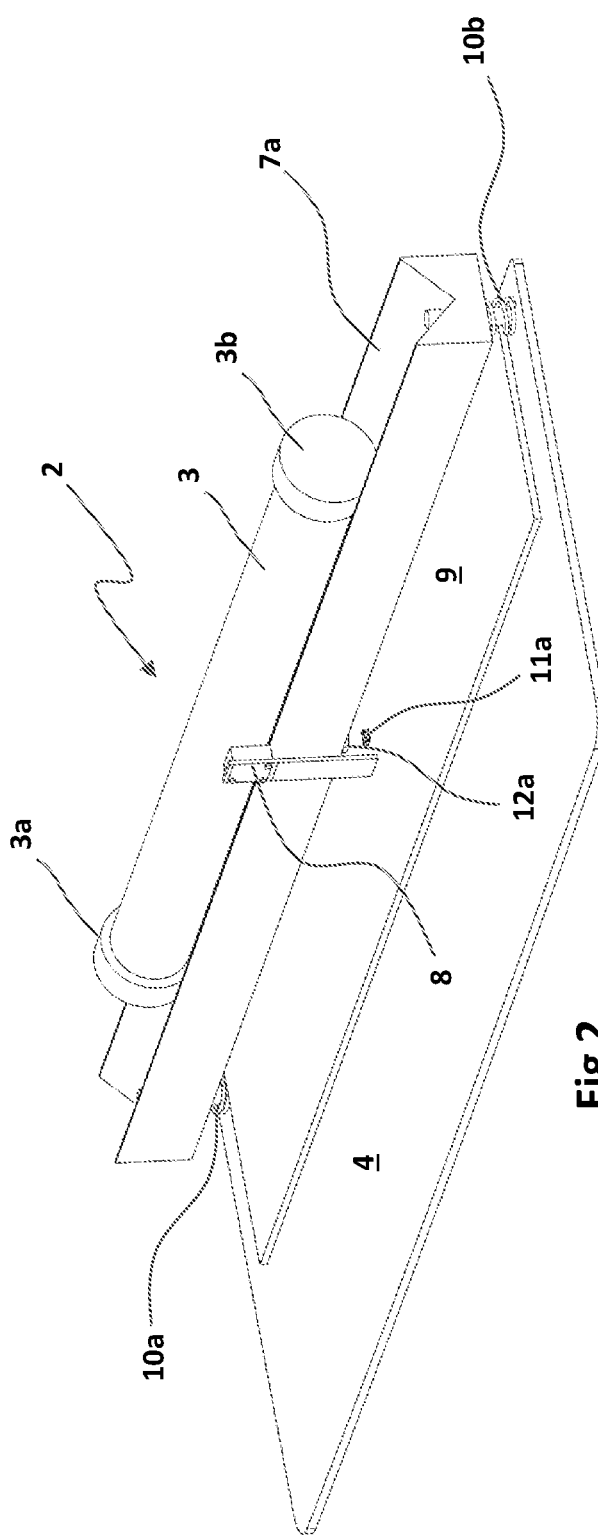
FIG. 2 shows a pointing device in a similar perspective view as in FIG. 1, but with the upper housing part/cover of the pointing device here removed, whereby the control device and its actuator cylinder, arranged in a V-shaped holder, an optical sensor and a position sensor can be seen.

FIG. 2 shows a pointing device in a similar perspective view as in FIG. 1, but with the upper housing part of the pointing device 1 removed. The actuator cylinder 3 of the control device 2 is, with its end cups 3*a,b*, here arranged in a holder, a beam 7*a* with a V-shaped groove, in which the actuator cylinder 3 can both be laterally displaced and rotated. The beam 7*a* is in turn arranged for limited movement in a vertical direction in relation to the pointing device 1 and its bottom and rests on compressible springs 10*a,b* in such a way that the actuator cylinder 3 and its holder, the beam 7*a*, in a mechanically unaffected position, its "rest position", is at a suitable height above the bottom of the pointing device 1.

A user's depressing of the actuator cylinder 3 results in a limited vertical movement of the actuator cylinder 3 and the holder/beam 7*a* in the direction of the bottom of the pointing device 1 and if the vertical movement has gone far enough so that a predetermined limit value is reached, preferably 1 mm, this results in that a "click" function is initiated.

An optical sensor 8 is arranged to the side of the actuator cylinder 3 and mounted on a motherboard 9, and thus fixed in relation to the bottom of the pointing device 1.

A sensor 11*a* in the form of a Hall element is arranged below the beam 7*a*, preferably at or near the center of the beam 7*a*. A magnet 12*a* is arranged below the beam 7*a* and placed directly above the sensor 11*a* so that the sensor 11*a* detects changes in the strength of the magnetic field when the beam 7*a* is moved in a vertical direction. The distance between the magnet 12*a* and the sensor 11*a* is preferably about 1.5 mm when the beam 7*a* and the actuator cylinder 3 are in rest position.

The sensor 11*a* thus detects positional changes of the actuator cylinder 3 in relation to the bottom of the pointing device 1.

The sensor 11a and the magnet 12a are preferably located in the same axial position, seen in relation to the beam 7a, as the optical sensor 8.

Figure 3:
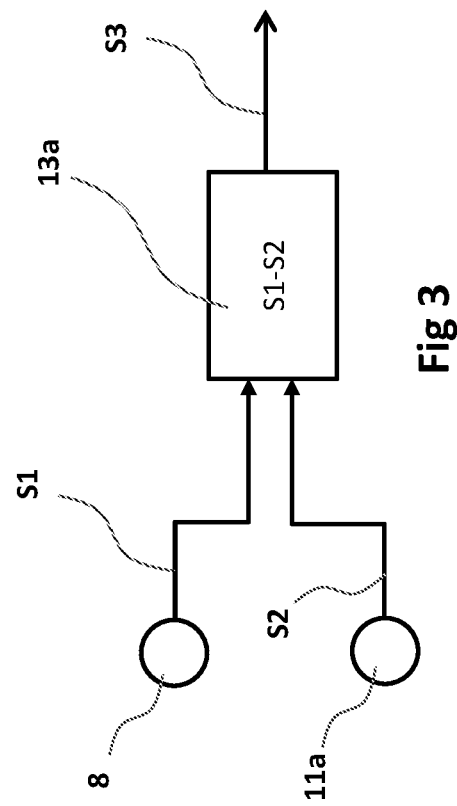
FIG. 3 basically shows a simple block diagram of the processing of the various signals from the optical sensor and the position sensor.

The optical sensor 8 is located at such a distance from the actuator cylinder 3 that its optics are focused on the surface/periphery of the actuator cylinder 3, whereby the sensor 8 detects each axial displacement, vertical movement and rotation of the actuator cylinder 3 and generates an output signal S1 (see FIG. 3). This output signal is then fed to a signal processing unit 13a.

FIG. 3 shows a simple block diagram of the electrical signals of the sensors 8, 11a and their processing. The signal processing is here only described in principle and the sensors 8, 11a can also be of a different design than that described above and can, for example, emit analog or digital signals.

In the present embodiment, the sensor 11a is exemplified as a Hall element, mounted on the motherboard 9, which in combination with the magnet 12a functions as a position-sensitive sensor. However, the position-sensitive detection can also take place capacitively, inductively or optically.

A vertical movement, "clicking", of the actuating cylinder 3, generates a change in the first sensor's 8 signal value S1 which, uncompensated, would result in an incorrect/unwanted vertical downward cursor movement on the monitor of a computer connected to the pointing device.

However, this unwanted vertical curser movement is compensated with the help of a signal processing unit 13a by subtracting a second signal value S2, from the second position-sensitive sensor 11a, which is proportional to the vertical movement of the actuator cylinder 3, from the first signal value S1 and thereby reducing/eliminating the unwanted vertical cursor movement on the monitor when "clicking on the actuator cylinder".

The signal processing unit 13a thus subtracts the signal value S2, which is only proportional to the vertical position change of the actuator cylinder 3, from the signal value S1 which is proportional to the rotation and position change of the actuator cylinder 3 in the vertical direction, whereby a resulting signal value S3 is obtained which is only proportional to the real/actual rotation. The signal value S3 in turn affects the position of the cursor on a connected computer.

When the signal value S2 reaches a predetermined threshold value, the signal processing unit 13a interprets this as a "click" which is forwarded to the connected computer.

Figure 4:
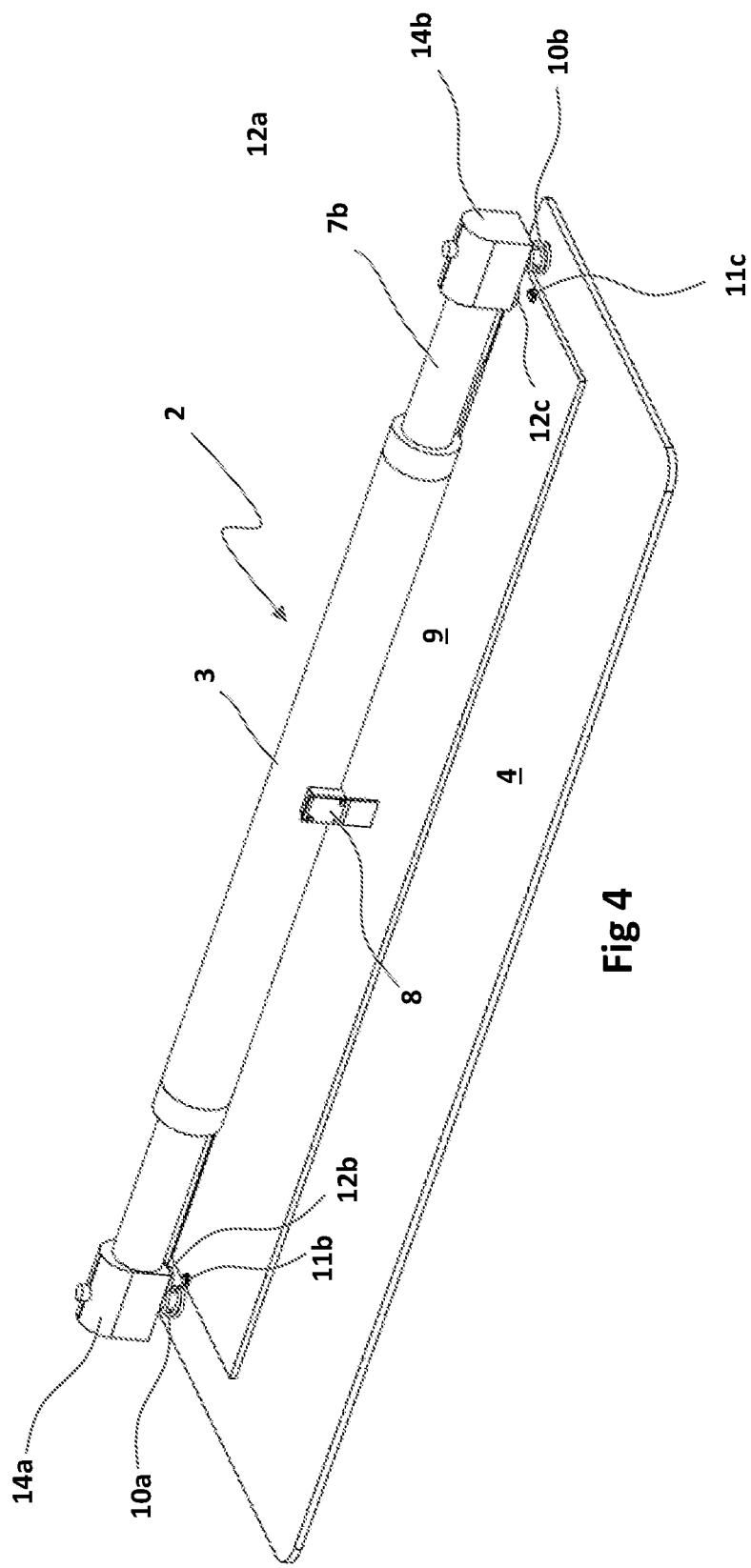
FIG. 4 shows an alternative control device with an actuator cylinder suspended rotatably around a central axis and where the axis in turn is limited in vertical movement via springy end pieces.

FIG. 4 shows an alternative control device 2 with an actuator cylinder 3 arranged rotatably around a central shaft 7b and where the shaft in turn is limited in vertical movement via its suspension in springy end pieces 14a,b.

Compressible springs 10a,b are arranged between the bottom of the pointing device 1 and the end pieces 14a,b in such a way that the actuator cylinder 3 and its holder, the central shaft 7b, in a mechanically unaffected position, rests at a suitable height above the bottom of the pointing device 1. Position-sensitive sensors 11b,c, preferably of the Hall element type, arranged below the respective end pieces 14a,b, detect the vertical position of the actuator cylinder 3 and if a user presses the actuator cylinder 3 down sufficiently against the bottom of the pointing device 1, so that a pre-determined threshold value is reached, this results in a "click" function being initiated. By the fact that two sensors 11b,c are arranged according to this design example, one under each end piece 14a,b, it is possible to compensate for, in the signal processing unit 13b, if the actuator cylinder 3 is pressed down asymmetrically, i.e. if one end is pressed down more than the other.

Here too, at the bottom of the pointing device 1, a motherboard 9 is arranged on which the optical sensor 8 is in turn arranged/fixed. The optical sensor 8 is located to the side of the actuator cylinder 3 and directed towards the actuator cylinder's 3 surface. The sensor 8 detects all movements of the actuator cylinder 3 and emits a first signal value S1 which is fed to a signal processing unit 13b (see FIG. 6).

FIG. 5 shows in more detail the suspension of the actuator cylinder 3, whereby the end piece 14b is thus movable in a vertical direction via the spiral spring 10b. The figure shows how the central axis 7b of the control device 2 is suspended in an end piece 14b at one end. A magnet 12c is arranged under the end piece 14b and a sensor 11c is arranged on the motherboard 9. The distance between the magnet 12c and the sensor 11c is typically about 1.5 mm when the actuator cylinder 3 and the shaft 7b are at rest. The strength of the magnetic field detected by the sensor 11c increases with decreasing distance to the magnet 12c. The sensor 11c generates a signal value S2b which is proportional to the vertical position of the end piece 14b in relation to the sensor 11c.

Similarly, the sensor 11b in combination with the magnet 12b detects the vertical position of the end piece 14a, whereby a signal S2a is generated.

FIG. 6 shows a block diagram of the processing of the electrical signals. The signal values S2a,b are subtracted in the signal processing unit 13b from the signal value S1. The resulting signal value S3 controls the cursor on a computer monitor connected to the system.

The signal processing unit 13a also sums the signal values S2a and S2b. When this sum reaches a predetermined threshold value, the signal processing unit 13a interprets this as a "click" which is forwarded to the connected computer.

The description above is primarily intended to facilitate the understanding of the invention, but the invention is of course not limited to the specified embodiments, but also other variants of the invention are possible and conceivable within the scope of the invention and of the enclosed patent claims.

The invention claimed is:

1. A pointing device (1) for controlling a cursor on a computer monitor, the pointing device comprising
   a control device (2) with two moving elements,
   an actuator cylinder (3) and a holder (7a,b), wherein
   the actuator cylinder (3) is rotatable and translatably stored relative to the holder (7a,b), and the actuator cylinder can be pushed down in a vertical direction by a user, and where a first sensor (8) is arranged to detect movement of the actuator cylinder (3) and emit a first signal value (S1) which is supplied to a signal processing unit (13a,b), wherein
   at least one second sensor (11a-c) is arranged to detect vertical position change of the actuator cylinder (3) in relation to a bottom (4) of the pointing device (1) and emit at least one second signal value (S2, S2a,b) that is proportional to the vertical position change of the actuator cylinder (3), which signal value (S2, S2a,b) is supplied to the signal processing unit (13a,b), and wherein
   the signal processing unit (13a,b) is arranged to subtract the second signal value (S2, S2ab) from the first signal value (S1) and thereby generate a resulting signal value (S3), which is directly proportional to an actual rotation of the actuator cylinder (3) and which in turn controls a position of the cursor on the computer monitor.

2. The pointing device according to claim 1, wherein the first sensor (8) is optical.

3. The pointing device according to claim 1, wherein the second sensor (11*a-c*) comprises a Hall element.

4. The pointing device according to claim 1, wherein the first sensor (8) is located at the side of the actuator cylinder (3).

5. The pointing device according to claim 1, wherein the second sensor (11*a-c*) for detecting the vertical position of the actuator cylinder (3) is located in the same axial position relative to the actuator cylinder (3) as the first sensor (8) for detecting the rotation of the actuator cylinder (3).

6. The pointing device according to claim 1, wherein the at least one second sensor (11*a-c*) for detecting the vertical position of the actuator cylinder (3) is located at at least one end piece (14*a,b*) of the control device (2).

\* \* \* \* \*